Sept. 30, 1952 R. FREEDMAN ET AL 2,612,141
WINDSHIELD WIPER SYSTEM
Filed Oct. 4, 1945 2 SHEETS—SHEET 1
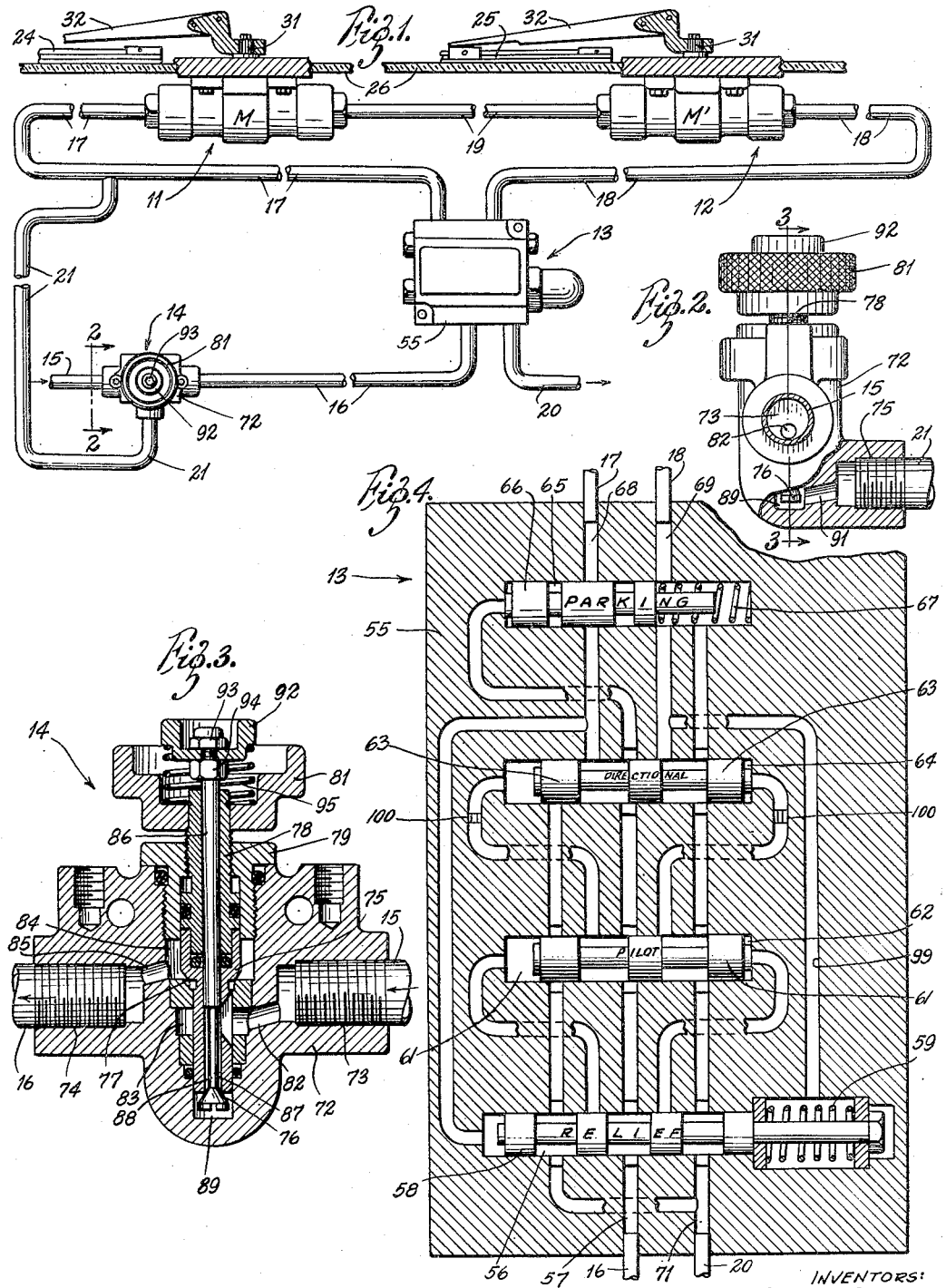
INVENTORS:
RUDOLPH FREEDMAN,
JOHN E. DUBE,
By Kingsland, Rogers & Ezell
ATTORNEYS.

Sept. 30, 1952  R. FREEDMAN ET AL  2,612,141
WINDSHIELD WIPER SYSTEM
Filed Oct. 4, 1945  2 SHEETS—SHEET 2
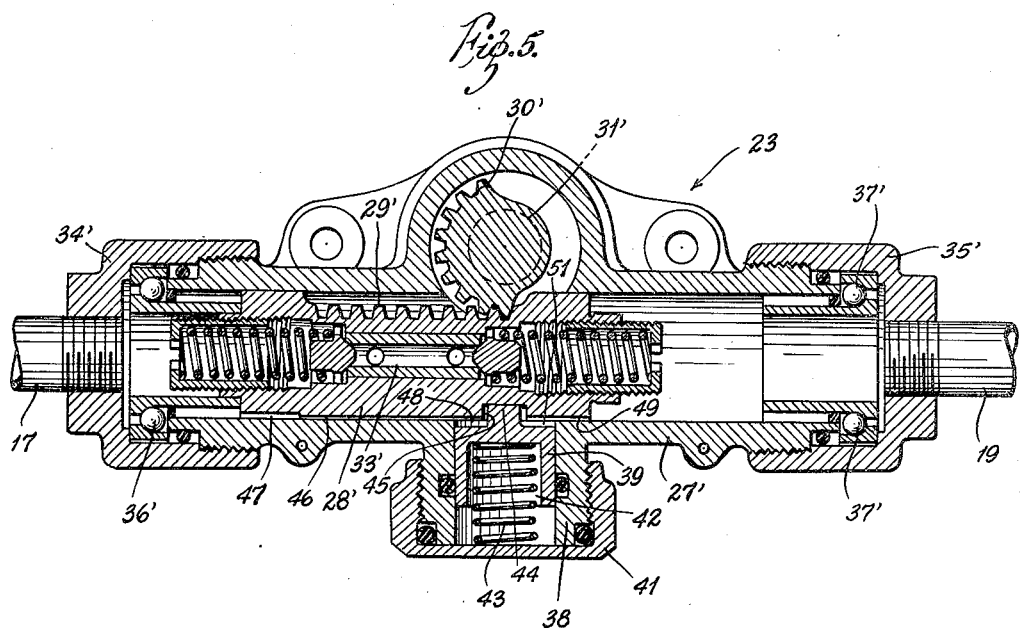
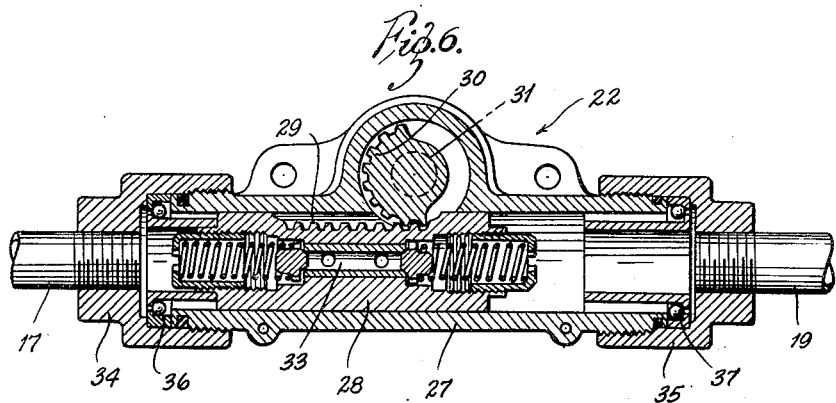
INVENTORS:
RUDOLPH FREEDMAN,
JOHN E. DUBE,
ATTORNEYS.

Patented Sept. 30, 1952

2,612,141

UNITED STATES PATENT OFFICE 2,612,141

WINDSHIELD WIPER SYSTEM

Rudolph Freedman, University City, and John E. Dube, Chesterfield, Mo., assignors, by mesne assignments, to Alco Valve Co., St. Louis, Mo., a corporation of Missouri Application October 4, 1945, Serial No. 620,317

3 Claims. (Cl. 121—158)

This invention pertains to improvements in hydraulic windshield wipers, and concerns itself primarily with apparatus providing for the parking of the wiper blades semiautomatically.

It is a general aim of the invention to provide a hydraulic windshield wiper device having means for moving a wiper blade to a selected position semiautomatically and maintaining the blade in this position when the device is not operating.

More specifically, it is an object of the invention to provide a hydraulic windshield wiper device having a speed control valve capable of controlling the flow of fluid to its wiper units in a manner such as to move the blades of the wiper units to a selected position semiautomatically for maintaining them in this position, commonly referred to as their parked or parking position.

Another object of the invention is to provide a hydraulic windshield wiper system with an improved speed control valve manually operable after the metering arrangement thereof has been moved to stop the wiper units to move the wiper blades to a parked position.

It is a further object of the invention to provide an improved speed control valve for a hydraulic windshield wiper system having, in addition to a metering valve, a parking valve operable after the former has been closed to supply fluid to a wiper unit line of the system in a manner such as to move the respective wiper blades to a parked position.

A still further object of the invention is to provide an improved hydraulic windshield wiper system having manually operable means to bypass high pressure fluid around the system's control unit into a wiper unit line, after stoppage of fluid to the control unit, for the purpose of moving the wiper blades of the system's wiper units to a parked position and thereafter maintaining them in this position by repeated applications of high pressure fluid.

Yet another object of the invention is to provide a hydraulic windshield wiper system in which the wiper blades of the system's wiper units may be moved to a parked position and thereafter maintained in this parked position by either mechanical or hydraulic locking means.

Other objects and advantages will become apparent as the description proceeds and a more comprehensive understanding of the invention will be afforded from the following detailed description when considered in conjunction with the accompanying drawings in which:

Fig. 1 is a plan view of a hydraulic windshield wiper system embodying the instant invention;

Fig. 2 is a side elevational view of a speed control valve employed in the system illustrated in Fig. 1 taken along the line 2—2 thereof;

Fig. 3 is a vertical sectional view of the speed control valve shown in Fig. 2 taken along the line 3—3 thereof;

Fig. 4 is a diagrammatic illustration of an improved control unit for the system illustrated in Fig. 1 showing the various parts thereof;

Fig. 5 is a vertical sectional view illustrating a hydraulic motor adaptable to the wiper units employed in the system; and Fig. 6 is a vertical sectional view of a modified form of a hydraulic motor also adaptable for use in the system's wiper units.

A hydraulic windshield wiper system embodying the instant invention is illustratted in Fig. 1 and contemplates the use of a pair of wiper units 11 and 12, a control unit 13, and a speed control valve 14, that acts as a main valve for the system. Fluid under pressure is admitted to the speed control valve 14 through a line 15 where it is metered for transmission through a line 16 to the control unit 13. From the latter device, a line 17 supplies fluid to the window wiper unit 11 and a line 18 supplies fluid to the window unit 12. Both units are connected by a line 19 which transmits fluid therebetween, and fluid from each of the units is exhausted through the control unit 13 to a line 20, which returns it to a reservoir (not shown). From the speed control valve 14 a line 21 is connected into the line 17 feeding the wiper unit 11, which provides for the bypassing of high pressure fluid from the line 15 around the control unit 13 and into the wiper line 17.

With the system just described, fluid under pressure is directed by the control unit 13 alternately to the hydraulic motors M and M' of the wiper units 11 and 12, respectively, in a manner such that their wiper blades 24 and 25 are moved back and forth across sector areas of the windshield 26 to maintain the same clear of the elements and provide clear visibility through the windshield.

As will now be described, the motors M and M' may take either one of the two illustrated forms, depending upon system requirements. As is more fully described in a copending application for a hydraulic windshield wiper system, United States Serial No. 620,318, filed October 4, 1945, by the instant inventors, now Patent No. 2,516,558 issued July 25, 1950, the form of the hydraulic motor illustrated in Fig. 5 contemplates the use of a mechanical locking means operable to lock the motor's piston in a fixed position to in turn lock the wiping blade of the wiping unit in a parked position. This improved motor embodies novel features which permit the locking of the piston without resort to return lines and offers a different locking arrangement over the basic unit illustrated in Fig. 6 which utilizes hydraulic locking means.

As described in a copending application, United States Serial No. 529,964, filed April 7, 1944, by Howard E. Rose, now Patent No. 2,516,594, issued July 25, 1950, the hydraulic motor 22 illustrated in Fig. 6 comprises a cylinder 27 in which a double-acting piston 28 is operative. The latter element is provided on its external surface with a rack 29 which is meshed with a pinion 30 fixed to a splined shaft 31 on which a windshield wiper arm 32 is carried. Located within the piston 28 is a double-acting relief valve 33. The relief valve has a spring-pressed valve element at each end, each abutting a tubular slide. As shown in the copending application, each spring resists flow through the piston, in its respective direction, until stoppage of piston 28 from movement, permits adequate hydraulic pressure build up to overcome the spring. The unit is also provided within its end connections 34 and 35 with dashpot check valves 36 and 37 and the unit is supplied fluid by connecting lines such as 17 and 19 threaded respectively into its end connections 34 and 35. Under the forces of fluid pressures supplied by the lines 17 and 19, the piston 28 of the motor is moved backward and forward to rock the shaft 31, the wiper arm 32, and, incidentally, the wiper blade 24, as will be described in connection with the system's operation.

The hydraulic motor 23, illustrated in Fig. 5, is similar in construction to that illustrated in Fig. 6. The similarity of the two motors will be accentuated by designating its similar parts by primed reference numerals. Thus, the motor 23 has a cylinder 27' in which a double-acting piston 28' is operative. The latter element is provided on its external surface with a rack 29' which meshes with a pinion 30' fixed to a splined shaft 31' on which a windshield wiper arm 32' is carried. Located within the piston 28' is a double-acting relief valve 33'. The unit is also provided with end connections 34' and 35' into which lines such as 17 and 19 are connected for the purpose of supplying fluid under pressure to the piston 28'. Also carried within the end connections 34' and 35' are the dashpot check valves 36' and 37'.

In addition, the casing 27' is provided with a boss 38 within which a locking piston 39 is slidably retained by a cap 41 screwed onto the boss 38. A recess 42 in the locking piston 39 forms a retainer for a compression spring 43 which, seating against an internal face of the cap 41, biases the locking piston 39 in a manner such as to move a lug 44, forming part of the latter element, into engagement in a groove 45 within the piston 28'. The latter element has a portion of its surface undercut to provide a passageway 46 communicating with a notch 47 through which fluid under pressure is transmitted to the chamber 48 above the locking piston 39. A similar notch 49 permits flow of fluid from the opposite end of the piston into a chamber 51, also above a portion of the locking piston 39. Under the influence of fluid admitted by either of the lines 17 or 19, the piston 39 is thus movable against the compressive forces of the spring 43 to remove the lug 44 from the notch 45 in the piston so that the latter element is free to move within the cylinder 27'. Conversely, when fluid pressure is removed from the unit, the spring 43 is operative to bias the locking piston upwardly so that the lug 44 thereof moves to engagement with the groove 45 of the piston and provides a positive mechanical lock for the piston in this position.

The control unit 13 which directs the flow of fluid to the hydraulic motors M and M' in a manner to reciprocate the wiper blades 24 and 25 comprises a valve body 55 in which there is channelled a plurality of conduits interconnecting four valve cavities containing four hydraulically operated valves. Under fluid pressure received from the line 16, three of these valves are manipulated to alternately apply pressure to the motors M and M', the said fluid being exhausted from the motor not receiving high pressure fluid through the control unit 13 and the line 20 back to storage.

As previously stated, high pressure fluid is admitted through the line 16. This line in turn is connected to a valve cavity 56 by means of a conduit 57. Within the cavity 56, a sliding valve 58 is operative. This valve, termed a double-acting relief valve, is biased to its neutral position by a spring 59, but is otherwise hydraulically operated. Through its operation, a second sliding valve 61, known as a pilot valve, is controlled. This valve is entirely pressure operated and functions in a valve cavity 62. A third sliding valve described as a directional valve 63 moves within a valve cavity 64 and controls the flow of high pressure fluid to either of the lines 17 or 18, depending upon which motor is to receive it. Within a fourth valve cavity 65, a parking valve 66 is operative and is biased to its illustrated position by means of a spring 67. This valve operates in conjunction with a parking valve in the speed control valve 14, as will be described more fully in connection with the system's operation.

The lines 17 and 18 are connected with the valve cavity 65 by two conduits 68 and 69, respectively, and the exhaust line 20 communicates with the valve cavity 56 by means of a conduit 71. Each of the valve cavities has interconnecting conduits and each of the various valves has reduced sections which permit a flow of fluid around that valve. The points of entry of the various conduits into the valve cavities form ports which are opened and closed, depending on the particular section of the valve moved over them. Conduits are also provided to apply pressure to the end sections of the various valves to effect their movement in their respective cavities.

The speed control valve 14 as a unit has two functions, one of which is to control the rate of a flow of fluid to the control unit 13, which, in turn, controls the speed at which the wiper blades are moved across the windshield, and the other is to park the blades in a selected position where they are maintained when the system is not operative. As illustrated in Figs. 2 and 3, this device comprises a valve body 72 provided with a pressure inlet opening 73, a pressure outlet opening 74 and a parking outlet 75. Each of these portions of the valve body is tapped and threaded to receive, respectively, the lines 15, 16 and 21. The valve body 72 is bored vertically normal to the inlet and outlet openings, and within this bore are retained both a metering valve 75 and a parking valve 76.

The former is movable vertically and seats against a shoulder 77 formed in the bore of the valve body. The metering valve 75 has a cup-shaped upper end fitted securely onto a threaded stud 78 which operates within a cap 79 closing the vertical bore of the valve body. To the stud 78, a thumb wheel 81 is attached. Operation of this wheel in a clockwise direction moves the stud 78 downwardly against the valve 75 to close the same against its seat. Opposite movement lifts the valve 75 from its seat 77 to open and permit high pressure fluid in the line 15, a port 82, and a chamber 83, to flow around the valve 75 into a chamber 84, through a port 85 communicating with the outlet opening 74 into the line 16.

The stud 78, as well as the metering valve 75, is bored to receive a parking valve stem 86. This stem engages a packing ring in the cup-shaped upper end of the valve 75. This stem 86 is provided at its lower end with a reduced section 87 which, together with the bore of the metering stem 75, forms a port or chamber 88 connecting the chamber 83 with a chamber 89. Thus, as the parking valve 76 is moved downwardly by the valve stem 86, it is opened and high pressure fluid from the inlet opening 73 is permitted to flow through the chamber 88 around the valve 76 into the chamber 89 from which point it flows through a port 91 to the parking outlet 75 and into the line 21. For operation of the parking valve 76, a button 92 is fixed to the stem 86 by means of two nuts 93 and 94. The thumb wheel 81 is recessed to retain a compression spring 95 which seats against the thumb button 92 and the thumb wheel 81. This spring is operative to maintain the parking valve 76 closed.

*Operation*

For the purpose of describing its operation, the system will be assumed to have been stopped after a previous use. In this condition, the wiper blades 24 and 25 will occupy their parked position to the left, as illustrated in Fig. 1, the pistons will be at the right (Fig. 5), and the entire system will be considered as being filled with fluid and properly bled. Further, the various valves of the control unit 13 will occupy the positions illustrated in Fig. 4. As a further aid to the description of the system's operation, quantitative fluid pressure values will be used although it is to be expressly understood that the system is not limited to any particular operating pressure or pressures nor to any particular pressure-exerting medium.

When it is desired to place the system in operation, high pressure fluid, which is impressed upon the system from a proper source through the line 15, is admitted thereto by opening the metering valve 75 of the speed control valve 14. The opening of this valve is accomplished by turning the thumb wheel 81 in a counterclockwise direction, and the amount of fluid which is admitted to the system, depending upon the degree to which the metering valve 75 is opened, determines the speed at which the system will operate. From the speed control valve 14 metered fluid is transmitted through the line 16 to the control unit 13. With the relief valve 58, the pilot valve 61 and the directional valve 63 positioned as illustrated, the work line 18 will be connected to the exhaust, or low pressure line 20, and the work line 17 will be closed by the parking valve 66. However, upon the admission of high pressure fluid into the control unit 13, the parking valve 66 will receive high pressure fluid on the left end thereof and will move to the right against the forces of the spring 67. Fluid pressure will hold this valve in this position as long as the system is operating. When in its open position, the parking valve 66 will be moved so that both of the lines 17 and 18 are ported to receive fluid pressure under the control of the directional valve 63, and the line 18 is cut off from the exhaust line 20.

Starting from a previous parked position, the wipers 24 and 25 will be to the left and the pistons 28 will be at the right, as noted. Once the parking valve is opened, high pressure fluid will be transmitted to the line 17 wherein a pressure will be developed which will operate to attempt to move the pistons 28 to the right and the wiper blades 24 and 25 to the left. Since the pistons of the hydraulic motors M' and M are already moved to their extreme right hand position, pressure of the fluid in the line 17 builds up against the total force of the valve-resisting springs of the pistons 28, to a value approximating four hundred and fifty pounds per square inch, which is equivalent to the active forces of the spring 59, of the relief valve 58, but which is below the total forces of all springs acting against the valves of the pistons 28. This pressure is applied also from the line 17 through the bypass passage 99 in the control 13, to the left end of the relief valve 58 which is normally held in a middle position by the spring 59. Since this pressure is sufficient to overcome the action of the spring 59, the relief valve 58 is moved to the right and fluid is ported to the right of the pilot valve 61 moving the same to the left. As the pilot valve 61 is moved to the left, high pressure fluid is ported against the directional valve 63, likewise to move it to the left. Since fluid from the pilot valve to the directional valve is preferably restricted in its flow, as by a restriction 100 in each passage to the respective ends thereof, the valve 63 moves more slowly than does the valve 61, and, accordingly, a full stroke of the valve 61 is assured. As the directional valve is moved to the left, high pressure fluid is ported into the line 18, and the line 17 is connected with the low pressure line 20 causing the pistons of the hydraulic motors M and M' to move to the left and reverse the wiper stroke. As soon as this occurs, the double-acting relief valve 58 is no longer pressure actuated, and the same is moved to its neutral or middle position by the spring 59, thus hydraulically locking the pilot and directional valves to the left. Under assumed conditions, the maximum operating pressure of the system is approximately four hundred pounds per square inch, which is insufficient to shift the relief valve 58 from its neutral position, the spring 59 being selected to require a pressure of four hundred and fifty pounds per square inch to move the valve. When the wipers and pistons reach the ends of their strokes, there will be a similar pressure built up that will act upon the right end of the relief valve, reversing the control 13 and the pistons.

Since both of the double-acting relief valves of either selected hydraulic motor are set for operation at two hundred and fifty pounds per square inch, there is a pressure drop across the two approximating five hundred pounds per square inch. Further, the piston of the motor M' may reach the end of its stroke prior to the time the motor M reaches the end of its stroke when pressure is being ported through the line 18. The converse may be true when high pressure fluid is being directed through the line 17. This will be true to the extent of leakage of liquid around the remote piston after each stroke, so that the interconnection including the line 19 is not completely filled. It is of course true in initially starting the system after it has been drained. Thus, for a period of time, fluid may flow through the relief valve of one of the motors which is receiving high pressure through the interconnecting line 19 to the other hydraulic motor of the second wiper unit and move its blade in synchronism. As both of the pistons reach their extreme stroke, either to the left or to the right, they offer a combined pressure drop of approximately five hundred pounds per square inch, and fluid no longer flows through the system. Accordingly, pressure builds up in one of the lines to the required four hundred and fifty pounds per square inch, sufficient to operate the relief valve 58 and the entire sequence of operation is repeated. Thereafter, and under the control of the control unit 13, high pressure fluid is directed alternately to the lines 17 and 18, and the wiper blades 24 and 25 are moved over the windshield 26.

When it is desired to stop the system and also to move the wiper blades 24 and 25 to a selected parked position, the metering valve 75 of the speed control valve 14 is first closed by turning the thumb wheel 81 in a clockwise direction. To operate the parking system most readily, this should be done when the wiper blades are moving to the left—that is when the directional valve 63 is to the right as illustrated, and high pressure fluid is being ported to the line 17. This operation cuts off high pressure fluid to the system, and the parking valve 66 of the control unit 13 is moved under the forces of the spring 67 to its illustrated position where it will be noted the line 17 is closed and the line 18 is opened to exhaust.

After the system has thus been brought to rest by closing of the metering valve, the blades of the wiper units are parked by manual operation of the parking valve 76. Here the operator depresses the thumb button 92 against the forces of the spring 95 to open the valve 76. This operation ports fluid from the high pressure line 15, around the parking valve 76, into the line 21. Since the line 17 is closed at the control unit 13 by the parking valve 66, high pressure fluid is active against the piston of the hydraulic motor wiper unit 11 which moves the blade thereof to the illustrated position where it may be locked either hydraulically or mechanically, depending upon the hydraulic motor selected for the wiper unit. Under the influence of high pressure fluid, the relief valve of the motor M is opened to transmit fluid through the line 19, to the motor M', and, through similar operations, the wiper blade 25 is moved to its parked position. Since the line 18 is opened to exhaust by the parking valve 66, fluid displacement in this part of the system is provided for.

As previously stated, the wiper blades and various units may be moved to their selected parked position and locked in this position either mechanically or hydraulically.

If mechanical locking is desired, the hydraulic motors of the wiper units 11 and 12 are selected to include the embodiments of the invention as illustrated in Fig. 5. Here the piston 28' is moved to an extreme position, depending upon its arrangement in the system, by manipulation of the parking valve 76. Thereafter, as pressure is cut off, when the valve 76 is closed, the spring 43 is operative to move the locking piston 39 into engagement with the slot 45 in the piston 28' and thereby lock the blade of the unit driven by the motor in its parked position. Movement of the piston 39 displaces a small amount of liquid in the system. However, this displacement is provided for by the opening of one line of the hydraulic motor to exhaust through the operation of the parking valve 66.

If a hydraulic motor, such as that illustrated in Fig. 6, is used, hydraulic locking of the wiper units in their parked position is resorted to. Thus, as high pressure fluid is admitted to the line 21 through operation of the parking valve 76, high pressure fluid is trapped in the system in the lines 17 and 21 between the control unit 13, the speed control valve 14 and the motor M by the parking valve 66 of the control unit 13. This pressure acting against the pistons of the various units retains them locked hydraulically. As will be apparent to those skilled in the art, this pressure will be subject to decay since fluid will pass through the wiper units, the line 18 and on to exhaust, through the control unit 13. When the pressure drop reaches a point, however, such as to permit the movement of the wiper blades from their parked position, all that is required is another injection of high pressure fluid into the trapped portion of the system by opening the parking valve 76.

While the particular embodiment of the invention has been illustrated and described, it will be apparent that the invention is subject to other modifications and changes and, accordingly, all such modifications and changes to which the invention is susceptible are considered to be covered as if described, and the invention is to be limited solely by the appended claims.

What is claimed is:

1. In a mechanism of the kind described, a fluid motor including a cylinder and a piston reciprocable therein, a fluid pressure operated reversing valve, a pair of fluid pressure work lines from the reversing valve to the opposite ends of the cylinder respectively, the reversing valve having a high pressure inlet and a low pressure outlet connectible with the pair of fluid pressure lines respectively, and means for reversing the last-named connections in response to fluid pressure conditions resulting from obstruction to travel of the piston; a main valve in the high pressure inlet for regulating high pressure flow to the reversing valve; a bypass valve for connecting the high pressure line to one of the work lines, and to bypass the reversing valve; and a parking valve in the two work lines movable from a first position to open both work lines to a second position to close the one work line interconnected with the bypass and to open the other work line to the low pressure outlet, means normally urging the parking valve toward second position, and means responsive to predetermined fluid pressure at the high pressure inlet to the reversing valve, to displace the parking valve to its first position.

2. The combination of claim 1, wherein the main valve comprises a housing with a main inlet, a main outlet for connection with the reversing valve and a bypass outlet, a main valve for opening the inlet to the main outlet, and a bypass valve for connecting the inlet with the bypass outlet.

3. The combination of claim 1, wherein at least one of the two last-named valves is a balanced valve and has pressure-operatable actuating means.

RUDOLPH FREEDMAN.
        JOHN E. DUBE.

REFERENCES CITED

The following references are of record in the file of this patent:

UNITED STATES PATENTS

| Number | Name | Date |
|---|---|---|
| 408,418 | Larking | Aug. 6, 1889 |
| 1,674,056 | Oishei et al. | June 19, 1928 |
| 1,738,311 | Oishei et al. | Dec. 3, 1929 |
| 1,806,301 | Le Valley | May 19, 1931 |
| 1,840,233 | Hueber | Jan. 5, 1932 |
| 2,045,140 | Horton et al. | June 23, 1936 |
| 2,312,686 | Campbell | Mar. 2, 1943 |
| 2,344,949 | Rappl | Mar. 28, 1944 |
| 2,348,346 | Horton et al. | May 9, 1944 |
| 2,352,120 | Rappl | June 20, 1944 |
| 2,370,376 | Snell | Feb. 27, 1945 |
| 2,387,006 | Buchanan | Oct. 16, 1945 |
| 2,404,747 | Sacchini | July 23, 1946 |